(12) United States Patent
Cruise et al.

(10) Patent No.: US 8,429,605 B2
(45) Date of Patent: Apr. 23, 2013

(54) FINITE STATE MACHINE ARCHITECTURE FOR SOFTWARE DEVELOPMENT

(75) Inventors: Robert B. Cruise, Bloomington, IN (US); Matthew C. Hockenheimer, Bloomington, IN (US); Thomas H. Mishler, Solsberry, IN (US); Paul L. Schmidt, Bloomfield, IN (US); Thomas H. Busch, Bloomington, IN (US); Logan A. Kittinger, Bloomington, IN (US); Keith E. Turpin, Solsberry, IN (US); Matthew A. Tokarsky, Indianapolis, IN (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 733 days.

(21) Appl. No.: 12/650,413

(22) Filed: Dec. 30, 2009

(65) Prior Publication Data

US 2011/0161926 A1    Jun. 30, 2011

(51) Int. Cl.
  *G06F 9/44* (2006.01)
  *G06F 9/45* (2006.01)
(52) U.S. Cl.
  USPC ............................ 717/113; 717/104; 717/109
(58) Field of Classification Search .......... 717/104–109, 717/113–116
  See application file for complete search history.

(56) References Cited

U.S. PATENT DOCUMENTS

| | | | | |
|---|---|---|---|---|
| 5,995,753 | A * | 11/1999 | Walker .......................... | 717/108 |
| 7,506,304 | B2 * | 3/2009 | Morrow et al. ............... | 717/109 |
| 7,509,654 | B2 | 3/2009 | Jennings et al. | |
| 7,530,052 | B2 * | 5/2009 | Morrow et al. ............... | 717/113 |
| 7,536,676 | B2 * | 5/2009 | Baker et al. ................... | 717/113 |
| 7,536,678 | B2 * | 5/2009 | Kothari et al. ................ | 717/124 |
| 7,676,791 | B2 * | 3/2010 | Hamby et al. ................. | 717/116 |
| 7,840,913 | B1 * | 11/2010 | Agrawal et al. ................ | 703/22 |
| 7,849,440 | B1 * | 12/2010 | Englehart ...................... | 717/106 |
| 7,867,086 | B2 * | 1/2011 | Sitrick ............................ | 463/31 |
| 7,877,727 | B2 * | 1/2011 | Sharp et al. .................... | 717/106 |
| 7,926,025 | B2 * | 4/2011 | Campbell et al. .............. | 717/104 |
| 7,950,004 | B2 * | 5/2011 | Vieira et al. ................... | 717/125 |
| 8,166,452 | B2 * | 4/2012 | Kinnucan et al. ............. | 717/105 |
| 8,171,438 | B2 * | 5/2012 | Ward ............................. | 716/104 |
| 8,200,807 | B2 * | 6/2012 | Raghavan et al. ............. | 709/224 |
| 8,225,278 | B2 * | 7/2012 | Tazoe et al. ................... | 717/109 |

(Continued)

FOREIGN PATENT DOCUMENTS

WO    WO 2004/079571    9/2004

OTHER PUBLICATIONS

Mian et al, "Dynamic trusted measurement model based on finite state machine", IEEE, pp. 316-318, 2011.*

(Continued)

*Primary Examiner* — Anil Khatri
(74) *Attorney, Agent, or Firm* — Christopher A. Monsey

(57) ABSTRACT

A system for developing an application program having functionality that corresponds to a finite state machine (FSM) model includes a visual interface that generates a graphical environment on a display for displaying an FSM model representing functionality of the program, a dynamic state machine processor that uses XML descriptions associated with the FSM model to generate the program executed at run-time, and an extensible graphic user interface that provides the end-user interface features to the end-user as generated during run-time by the processor based on the FSM model.

19 Claims, 15 Drawing Sheets

U.S. PATENT DOCUMENTS

| | | | |
|---|---|---|---|
| 8,365,139 B2 * | 1/2013 | Szpak | 717/105 |
| 8,370,798 B2 * | 2/2013 | Broadfoot et al. | 717/107 |
| 2003/0014439 A1 | 1/2003 | Boughannam | |
| 2006/0218161 A1 | 9/2006 | Zhang et al. | |
| 2007/0033273 A1 | 2/2007 | White et al. | |
| 2007/0073739 A1 | 3/2007 | Jennings et al. | |
| 2007/0288885 A1 | 12/2007 | Brunel et al. | |
| 2008/0071802 A1 | 3/2008 | Lucco et al. | |
| 2008/0164908 A1 | 7/2008 | Challenger et al. | |
| 2008/0201333 A1 | 8/2008 | Rowley | |

OTHER PUBLICATIONS

Kieffer, "Strongly consistent code based identification and order estimation for constrained finite state model classes", IEEE Trans. on Info. Theory, vol. 39, No. 3, pp. 893-902, 1993.*

Tsarev et al, "Finite state machine induction using genetic algorithm based on testing and model checking", ACM GECCO, pp. 759-762, 2011.*

Cheng et al, "Automatic generation of functional vectors using the extended finite state machine model", ACM Trans. on Design of Electronic Sys. vol. 1, No. 1, pp. 57-79, 1996.*

Corbett, "Using shape analysis to reduce finite state models of concurrent Java programs", ACM Trans. of SW Eng. & Methodology, vol. 9, No. 1, pp. 51-93, 2000.*

Chatty et al., "Combining SVG and models of interaction to build highly interactive user interfaces," 21 pgs., obtained Dec. 30, 2009 from http://www.svgopen.org/2005/papers/CombiningSVGModelsBuildInteractiveUserInterfaces/, SVG Open 2005.

Hjelmqvist, S., "XML Finite State Machine in VB.NET," 3 pgs., obtained Dec. 30, 2009 from http://www.codeproject.com/KB/cpp/xmlfinitestatemachine.aspx, The Code Project.

XML Schema (W3C), 8 pgs., obtained Dec. 30, 2009 from http://en.wikipedia.org/wiki/XML_Schema_(W3C).

Virtual finite state machine, 3 pgs., obtained Dec. 30, 2009 from http://en.wikipedia.org/wiki/Virtual_finite_state_machine.

* cited by examiner

FINITE STATE MACHINE ARCHITECTURE FOR SOFTWARE DEVELOPMENT

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon.

FIELD OF THE DISCLOSURE

The present disclosure relates generally to methods and systems for development of software applications, and more particularly to methods and systems for employing a finite state machine architecture to generate, modify, and maintain software applications.

BACKGROUND AND SUMMARY OF THE DISCLOSURE

The development of typical software applications of even nominal complexity requires the skills of programmers familiar with a middle-level or high-level programming language such as C++. Often, such programmers develop applications based on functional requirements specified by end-users of the applications. While the end-users are typically unfamiliar with programming, they are highly skilled in the activities that employ the software applications. Frequently, after an application is generated by the programmers and released to the end-users, the end-users identify errors in the application or enhancements that would improve the usefulness of the application. In the typical software development cycle, after a period of use of an application, the end-users may submit a listing of these errors and/or enhancements to the programmers, who then create an updated application using a high-level programming language.

It is known that a substantial majority of the life cycle costs associated with many software applications are incurred in post-release support activities such as debugging, enhancing functionality, and adapting the applications to changes in the end-use environment. These support activities are expensive because they require the involvement of highly skilled (and relatively highly compensated) programmers who must perform the often time consuming task of writing/rewriting and testing code in a high-level programming language. Such high life cycle costs are particularly problematic for organizations that require large numbers of software applications because they perform a wide variety of tasks and/or multiple tasks that must be performed under changing operational environments. The iterative development approach described above is especially inefficient for software applications that provide relatively simple functionality, a characteristic of many special purpose applications, because it employs highly skilled programmers using high-level programming languages to modify basic functions.

As indicated above, another problem with the conventional software development approach is the inefficiencies that arise from the knowledge gap between the programmers and the end-users about the needs to be addressed by a particular application. The end-user is the expert on the requirements of the application, but can only provide feedback to the programmers because the end-user is typically not qualified to revise the application to incorporate the desired functionality. Thus, the end-user must educate the programmers on the operational environment for the application and the desired functional modifications. This transfer of knowledge takes time, and invariably some portion of the end-user's feedback is lost in the process. The situation is frequently made worse by the physical separation between the end-users and the programmers.

The present disclosure provides a software architecture that reduces the need for involvement of high-level programmers in the life cycle of certain software applications by enabling development and maintenance of such applications without the use of high-level programming languages. As a result, the methods and systems of the present invention should reduce life cycle costs. Additionally, as the development and maintenance of the applications may be performed by properly trained technicians familiar with the requirements of the applications and the operational environments, but not necessarily familiar with abstract programming, the inefficiencies associated with the knowledge gap between the programmers and the end-users may be reduced. For example, the architecture of the present disclosure permits on-site trained, non-programmer technicians to work with end-users to provide application updates, rather than requiring communication with remote programmers who are less familiar with the actual deployment of the application.

More specifically, the present disclosure provides a software architecture for development of applications having functionality that can be effectively modeled using finite state machine elements. This characteristic is common to many special purpose software applications that enable an end-user to perform a particular task or set of tasks that involve a manageable number of different stages or states. Although the present disclosure refers to the creation and maintenance of applications of relatively low complexity, it should be understood that, in theory, any software application can be modeled using finite state machine elements. The present system generally includes a dynamic state machine processor (DSMP) that manages execution of finite state machine elements representing the functionality of the software application (referred to hereinafter as an "FSM model"), an extensible graphic user interface (GUIX) with functionality that is entirely dependent upon the FSM model, and a visual interface for programming extensible routines (VIPER) that enables technicians without high-level programming experience (but trained on the use of VIPER) to create and modify FSM models using a graphic environment with drag/drop finite state machine elements.

As is further described below, the DSMP provides the execution environment to the end-user by accessing a database of markup language descriptions associated with the various elements of the FSM model and a library of standard actions that are called by the descriptions. Any of a variety of suitable markup languages, or similar languages, may be used. This description will refer to XML as the markup language as an example only, and not to limit the scope of the disclosure. The standard actions are basic software functions typically written in a high-level programming language, such as mathematic functions, that perform discrete actions that are common to many applications. Using both the XML code in the database and the standard actions specified by that code, the DSMP executes the various steps necessary to generate the actual software application run by the end-user.

As part of its execution of the application, the DSMP interacts with the GUIX to provide the features needed to permit the end-user to interface with the application. In one embodiment of the system, the GUIX includes no hard-coded interface features, but instead provides during run-time only those interface features specified by the currently executing FSM model. As indicated above, these interface features are specified by the primary inputs to the DSMP (i.e., the XML descriptions of the FSM elements and the standard actions called by the XML descriptions). Accordingly, the functionality of the application is provided by the DSMP and the GUIX, and is dependent only upon the XML descriptions for the FSM model. As such, the functionality of the application may be modified (or created) by simply modifying the XML descriptions, which is an activity that does not require familiarity with a high-level programming language.

Creation and modification of the XML descriptions is carried out by the technician using the VIPER environment. VIPER permits the technician to retrieve an existing FSM model and view the various FSM elements of the model in a graphic environment. As explained in detail below, the technician may then rearrange, delete, add or otherwise modify the individual FSM elements to achieve the desired modifications to the functionality of the FSM model. The technician may also create entirely new FSM models using VIPER. After a model is created or modified, the technician may save the model, thereby causing VIPER to automatically create the appropriate XML descriptions corresponding to the model and write those descriptions to the database for use by the DSMP.

These and other features of the present disclosure will be readily apparent to those skilled in the art upon reference to the following description and the accompanying drawings.

Figure 1:
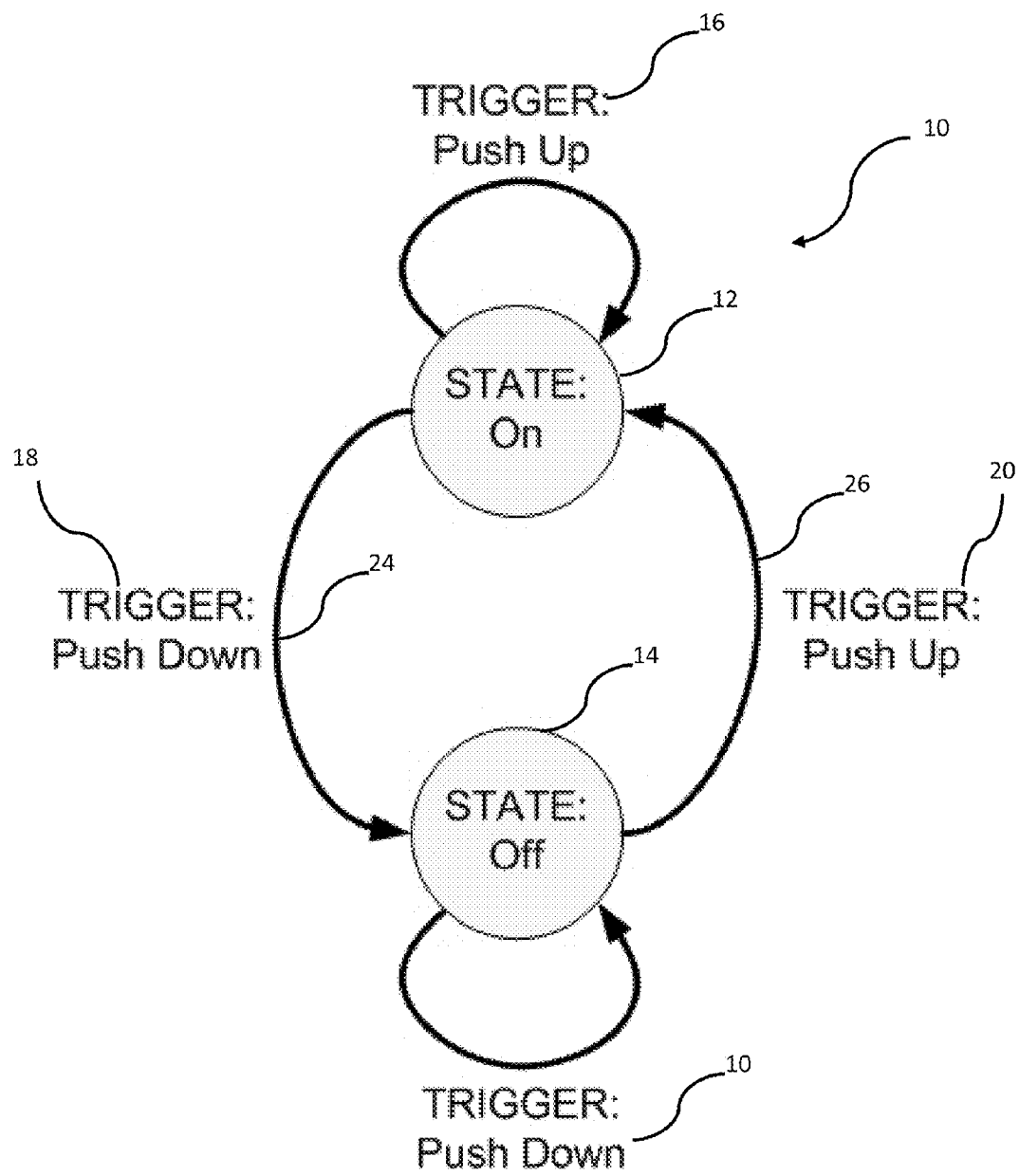
FIG. 1 is a diagram of a simple finite state machine model.

Although the drawings represent embodiments of various features and components according to the present invention, the drawings are not necessarily to scale and certain features may be exaggerated in order to better illustrate and explain the present disclosure. The exemplifications set out herein illustrate embodiments of the disclosure, and such exemplifications are not to be construed as limiting the scope of the disclosure in any manner.

DETAILED DESCRIPTION OF EMBODIMENTS OF THE DISCLOSURE

For the purposes of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated system and described method and further applications of the principles of the disclosure, which would normally occur to one skilled in the art to which the disclosure relates. Moreover, the embodiments were selected for description to enable one of ordinary skill in the art to practice and implement the principles described herein.

The following description uses the example of a fire control application for an end-user in a military operational environment. A fire control application is an example of a category of applications that may be characterized as mission control applications. Fire control applications generally are used to enable an end-user to orient a weapon such that when fired, a round from the weapon will land at a desired location corresponding to a target. Fire control applications typically receive position information (e.g., longitude and latitude) relating to a target and with input from the end-user and based on the known orientation and capabilities of the weapon, communicate with the weapon to provide control signals causing the weapon to assume an orientation appropriate for acquiring the target. While the fire control application described below is useful for explaining the various components and functions of the present architecture, it should be understood that the systems and methods of the present disclosure may be employed to provide a software development architecture for creation and modification of a wide variety of software applications of varying complexity and for different operational environments.

As indicated above, the present architecture is based on the use of finite state machines. A finite state machine ("FSM") is a very specific logical structure that may be defined as a model of a behavior or process that defines the actions the process may take, which events it expects to happen, and how it will respond to those events. FSM systems or models generally include the characteristics of having a finite set of defined states, only one of which may be occupied at a particular time, a set of defined inputs (i.e., actions that occur upon entering a state), a set of defined outputs (i.e., actions that occur upon exiting a state), and a set of transitions between states. In operation, a FSM model reacts to an external input or internal condition with a specific action, which may include transition from the current state to another defined state.

FIG. 1 is a depiction of a FSM model of a very simple "system," a light switch. As shown, the FSM model 10 includes two states: an ON state 12 and an OFF state 14. The ON state 12 includes two inputs or triggers: a push up trigger 16 and a push down trigger 18. Similarly, the OFF state 14 includes a push up trigger 20 and a push down trigger 22. Finally, ON state 12 and OFF state 14 are connected by transitions 24, 26. In operation, push up trigger 16 causes no action, as model 10 remains in ON state 12. Push down trigger 18 causes model 10 to move via transition 24 from ON state 12 to OFF state 14. Similarly, model 10 responds to push down trigger 22 by remaining in OFF state 14, while push up trigger 20 causes model 10 to move via transition 24 from OFF state 14 to ON state 12.

Figure 2:
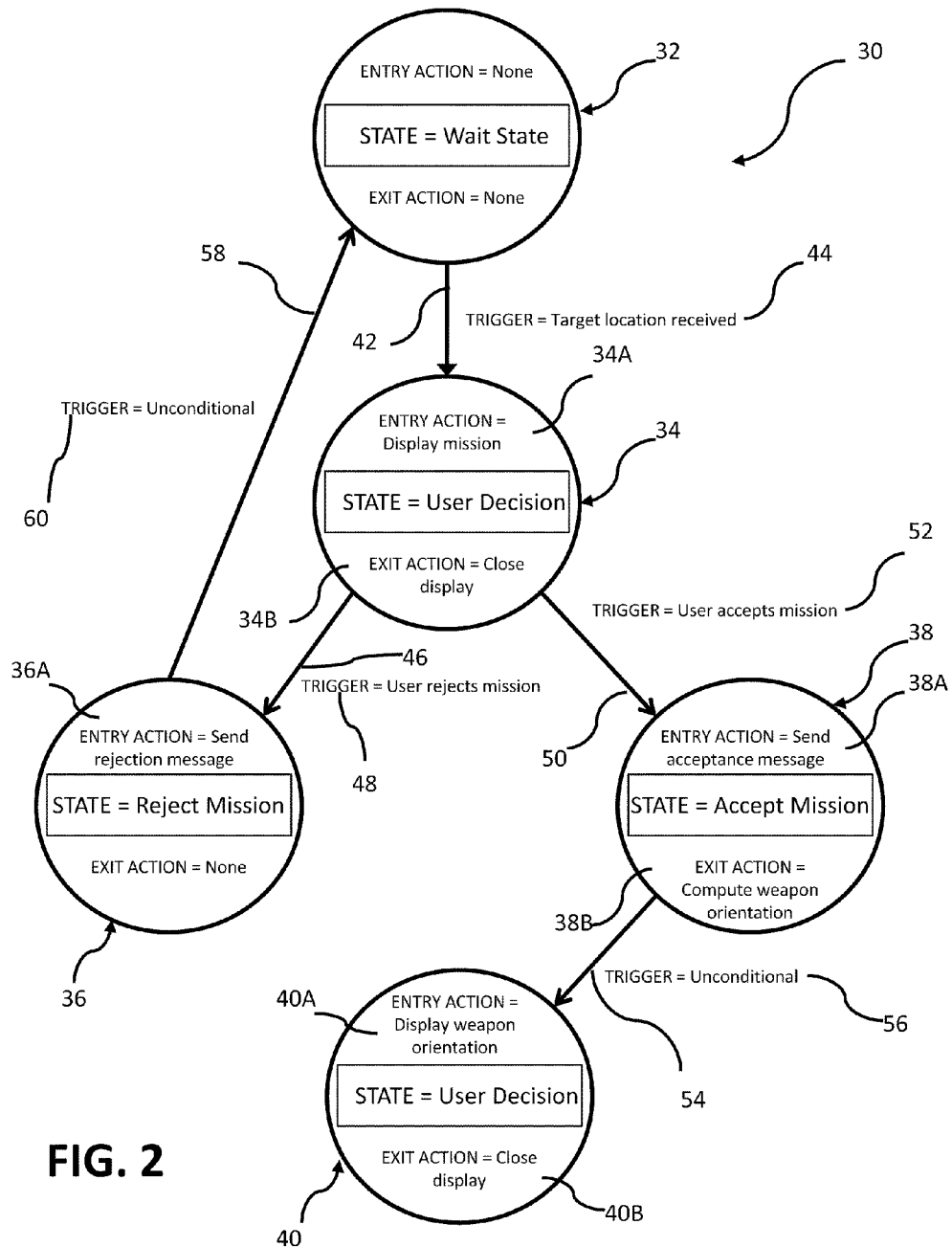
FIG. 2 is a diagram of a finite state machine model of a fire control application.

Referring now to the conceptual FSM model diagram of FIG. 2, an FSM model may be enhanced by associating entry actions and exit actions with the various defined states in the model. FSM model 30 is a simplified version of a fire control application model. Model 30 includes a Wait State 32, a User Decision State 34, a Reject Mission State 36, an Accept Mission State 38, and a User Decision State 40. State 32 is connected to State 34 by a transition 42 which is activated by a trigger 44. State 34 is connected to State 36 by a transition 46 which is activated by a trigger 48. State 34 is also connected to State 38 by a transition 50 which is activated by a trigger 52. State 38 is connected to State 40 by a transition 54 which is activated by a trigger 56. Finally, state 36 is connected to State 32 by a transition 58 which is activated by a trigger 60.

As shown in the figure, state 32 does not have any entry or exit actions associated with it. State 32 simply models a waiting condition of the software application wherein an external input must be provided to cause the application to perform another function. Here, the external input is trigger 44, which is a message from an external source (such as a target acquisition system) indicating that a target has been located. The target location received message of trigger 44 also includes information identifying the position of the target in terms of, for example, longitude and latitude. Upon receipt of trigger 44, model 30 moves from state 32 to state 34 via transition 42.

State 34, which is labeled a user decision state, includes an entry action 34A and an exit action 34B. Entry action 34A represents the functionality of the software application that displays the mission to the end-user, wherein the displayed mission includes an indication that a target has been located and a request for the user to accept or reject the mission of orienting the weapon to engage the target. The inputs to state 34 are triggers 48 and 52, which correspond to the user's rejection or acceptance of the mission, respectively. The user may provide this input through any suitable input device. Upon receiving either trigger 48, 52, model 30 exits state 34 and performs exit action 34B, which represents the functionality of the software application that removes the displayed mission. As is further described below, the functionality of the various exit and entry actions described in this section are provided by standard actions or groups of standard actions that are called out in the XML descriptions of the corresponding FSM element.

In situations where the user rejects the mission (i.e., provides trigger 48), model 30 moves from state 34 to state 36 via transition 46. The entry action 36A associated with state 36 represents the functionality of the software application that sends a message to the source of the target location received message of trigger 44 indicating that the mission has been rejected by the user. Trigger 60 is an unconditional trigger that represents an immediate move via transition 58 from state 36 to state 32 without requiring external input or changes in internal conditions.

Alternatively, in situations where the user accepts the mission (i.e., provides trigger 52), model 30 moves from state 34 to state 38 via transition 50. The entry action 38A associated with state 38 represents the functionality of the software application that sends a message to the source of the target location received message of trigger 44 indicating that the mission has been accepted by the user. State 38, like state 36, is a transitory state that moves to state 40 via transition 54 without the need for an input (as indicated by unconditional trigger 56). However, the exit action 38B associated with state 38 is performed before making the transition to state 40. Exit action 38B represents the functionality of the software application that computes an orientation of the weapon required to engage the identified target. As is explained further herein, this exit action 38B includes a variety of computations based on the target location, the current orientation of the weapon, the current environmental conditions, and the capabilities of the weapon.

The entry action 40A associated with state 40 represents the functionality of the software application that displays the computed weapon orientation to the user. In this abbreviated example, the software application simply provides weapon orientation information to the user, and does not communicate with the weapon directly. Moreover, as depicted in FIG. 2, state 40, which represents the user's decision to orient the weapon with the computed orientation information, includes only an exit action 40B representing the removal of the displayed orientation information. It should be apparent from the foregoing that state 40 may be connected back to state 32 to model the application looping to a wait state to wait for location of another target.

The above-described FSM model may be constructed and/or modified using VIPER according to the principles of the present disclosure by a technician without familiarity with a high-level programming language. Throughout this disclosure, the term "technician" is used to refer to the individual operating VIPER to construct and/or modify (typically, modify) FSM models for software applications. The term "programmer" is used to refer to the individual who writes and/or modifies the various components of the present system (i.e., the DSMP, GUIX, VIPER, and the standard actions associated with the FSM models). Finally, the term "end-user" is used to refer to the individual who executes a software application based on a FSM model using the various components of the present system. These references are not meant to be limiting in any way, and it should be understood that the same individual may perform the tasks of any combination of an end-user, a technician, and a programmer. In a typical situation, however, the level of familiarity with high-level programming languages increases from the end-user, to the technician, and finally to the programmer.

One aspect of the architecture of the present system is to allocate the tasks associated with creating and modifying software applications among the typical participants (i.e., end-user, technician, and programmer) in a manner that leverages the participant's expected familiarity with either the requirements of the software application based on its deployment in an operational environment or the programming and modeling necessary to achieve those requirements. As a generalization, the present disclosure assumes the end-user is most familiar with the requirements of the software application because he or she is responsible for carrying out the tasks enabled by the application. The programmer is assumed to be most familiar with the high-level programming required to construct a system according to the present disclosure. The technician is assumed to be a participant having a level of familiarity with the use (as opposed to the design) of software and a level of familiarity of the requirements of a particular software application that fall somewhere between the end-user and the programmer.

Figure 3:
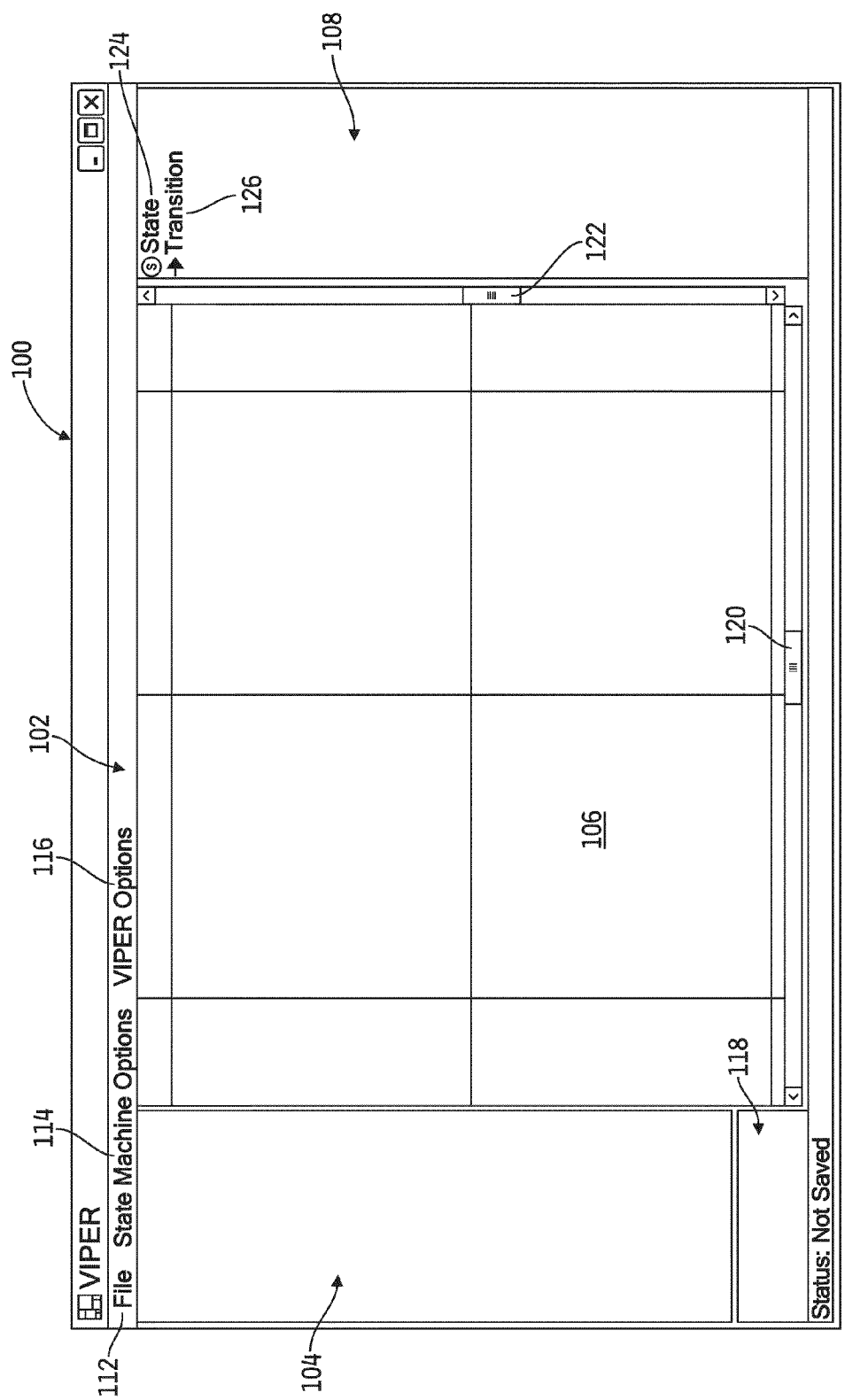
FIGS. 3 through 12 are screenshots generated by VIPER.

When the technician executes VIPER to construct or modify an FSM model, a design screen 100 as shown in FIG. 3 is displayed. Design screen 100 generally includes a menu bar 102, a properties pane 104, a workspace 106, and an elements pane 108. Menu bar 102 includes a file dropdown 112, a state machine options dropdown 114, and a VIPER options dropdown 116. Properties pane 104 includes a comments area 118 for assisting the technician in using the properties pane as described below. Workspace 106 includes a horizontal scroll bar 120 and a vertical scroll bar 122. Finally, elements pane 108 includes a state icon 124 and a transition icon 126.

File dropdown 112 of menu bar 102 includes standard options for creating a new file, opening an existing file, saving a current file, and exiting VIPER. State machine options dropdown 114 includes controls for version tracking of the FSM models processed using design screen 100. VIPER options dropdown 116 includes controls for configuring the VIPER environment for particular technicians or classes of technicians. For example, radio buttons may be provided to turn tutorial prompting on and off, etc.

The following example illustrates the process of a technician constructing a new FSM model for a desired software application, in this case, a fire control application similar to that described above with reference to FIG. 2. It should be understood, however, that the technician may use VIPER to open an existing FSM model and edit its characteristics to achieve different functionality for the corresponding software application as suggested, for example, by an end-user of the software application.

Before executing VIPER, the technician, in cooperation with the end-user and others, must first conceptualize the type of task to be performed by the software application and its execution characteristics. In the conceptualization phase of this example, it was determined that the task is to communicate target locations supplied by an external source to an end-user responsible for deciding to fire a weapon at identified targets, and, when the end-user accepts the mission of firing at the identified targets, to provide to the end-user weapon orientation information to be used to aim the weapon such that a round fired from the weapon will hit the target.

Figure 4:
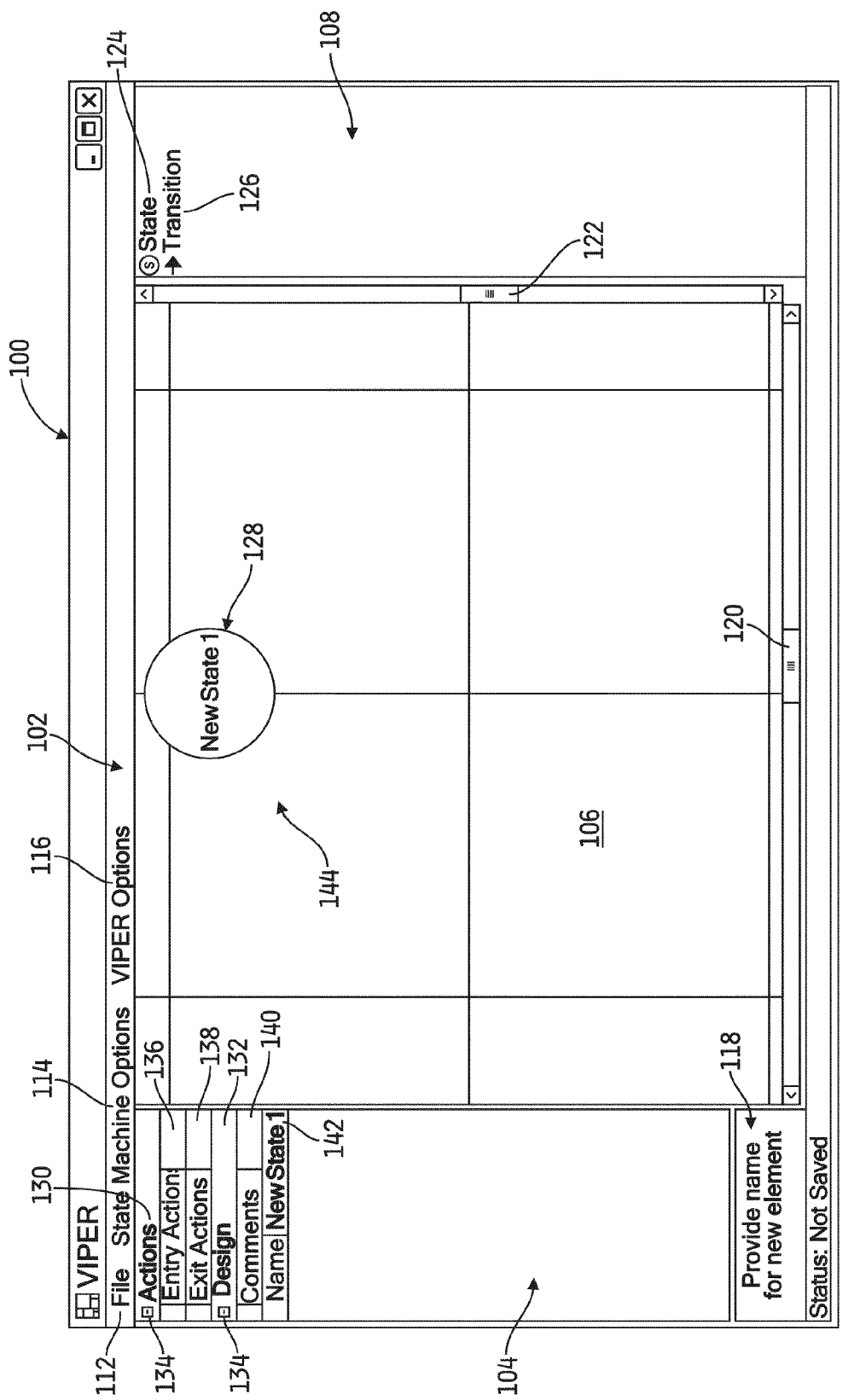

Referring still to FIG. 3, the technician begins construction of an FSM model by populating workspace 106 with FSM elements (i.e., states and transitions) according to the desired functionality of the software application as determined in the conceptualization phase. The technician places the first state in workspace 106 by clicking on state icon 124, dragging a temporary marker (not shown) to a desired location on workspace 106, and dropping the temporary marker. As shown in FIG. 4, a state element 128 (temporarily labeled "New State 1") is provided in the desired location as a result of the drag/drop operation described above. Additionally, properties pane 104 is automatically populated with characteristics lists for the currently active FSM element. Here, properties pane 104 includes an actions characteristics list 130 and a design characteristics list 132, each having an associated expansion button 134 for showing or hiding the content associated with the list. Actions characteristics list 130 includes an entry actions field 136 and an exit actions field 138. Design characteristics list 132 includes a comments field 140 and a name field 142, which is initially populated with the temporary name "New State 1." As name field 142 is automatically activated upon dragging and dropping an FSM element into workspace 106, comments area 118 provides information about using name field as shown in FIG. 4. In this example, the technician names state element 128 "Wait State" and provides comments in comments field indicating that state element 128 is the initial state of the FSM model 144 under construction which represents the mission state of waiting for a target location message from an external source. As depicted in FIG. 4, the initial state of the sample fire control application model does not include an entry state or an exit state. Accordingly, the technician in this example does not populate entry actions field 136.

Figure 5:
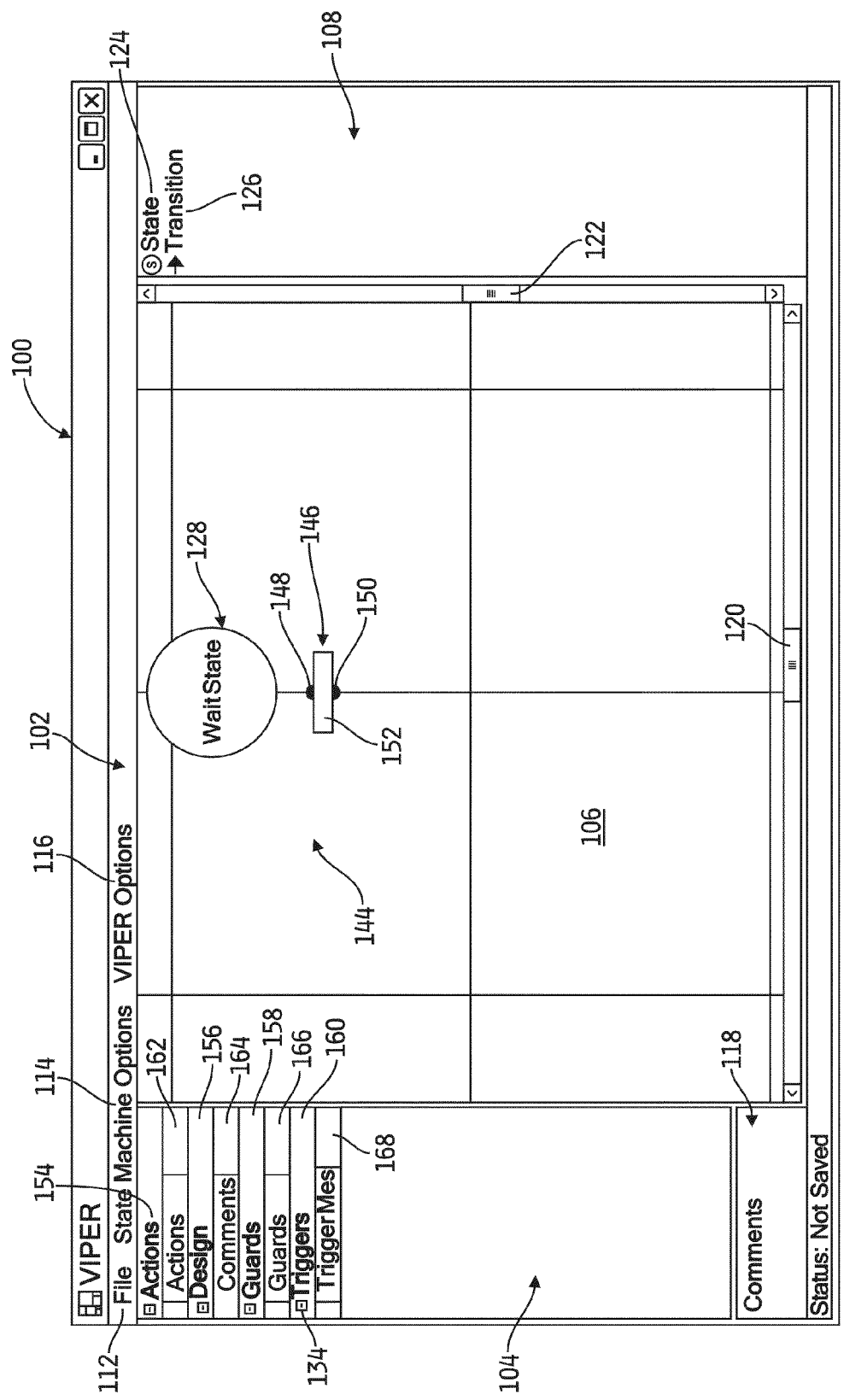

Referring now to FIG. 5, the technician next adds a transition element to FSM model 144 from the selection of FSM elements in elements pane 108. Here, the technician uses transition icon 126 to drag and drop transition element 146 in the location shown. Transition element 146 includes a connection handle 148, a connection handle 150 and a body 152. The action of dropping transition element 146 into workspace 106 causes VIPER to automatically populate properties pane 104 with characteristics lists corresponding to the currently active transition element 146. As shown, properties pane 104 now includes actions characteristics list 154, design characteristics list 156, guards list 158, and triggers list 160, along with corresponding expansion buttons 134. Action characteristics list 154 includes actions field 162. Similarly, design characteristics list 156 includes comments field 164, guards list 158 includes guards field 166, and triggers list 160 includes trigger messages field 168.

Figure 6:
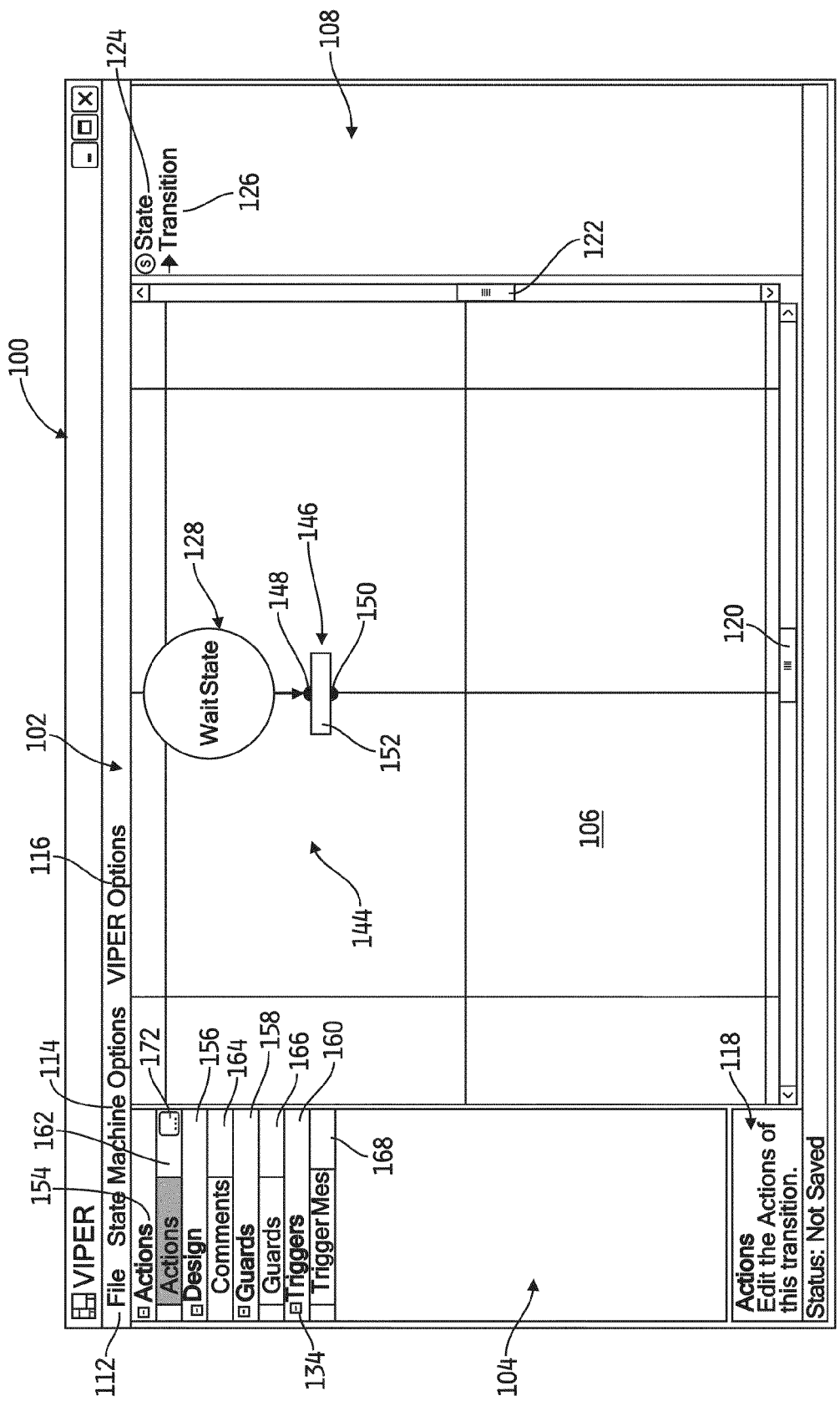

As shown in FIG. 6, after the technician clicks on connection handle 148 and drags it to state element 128, a connection arrow 170 extends between state element 128 and transition element 146. After making the connection, the technician may populate the various characteristics lists of properties pane 104. As was the case with state element 128, the technician may populate comments field 164 with descriptive information about the function of transition element 146. Actions field 162 is used to associate one or more standard actions with the currently active FSM element. When the user clicks in actions field 162, an editor button 172 is displayed in actions field 162 and instructional information relating to use of actions field 162 is provided in comments area 118.

Figure 7:
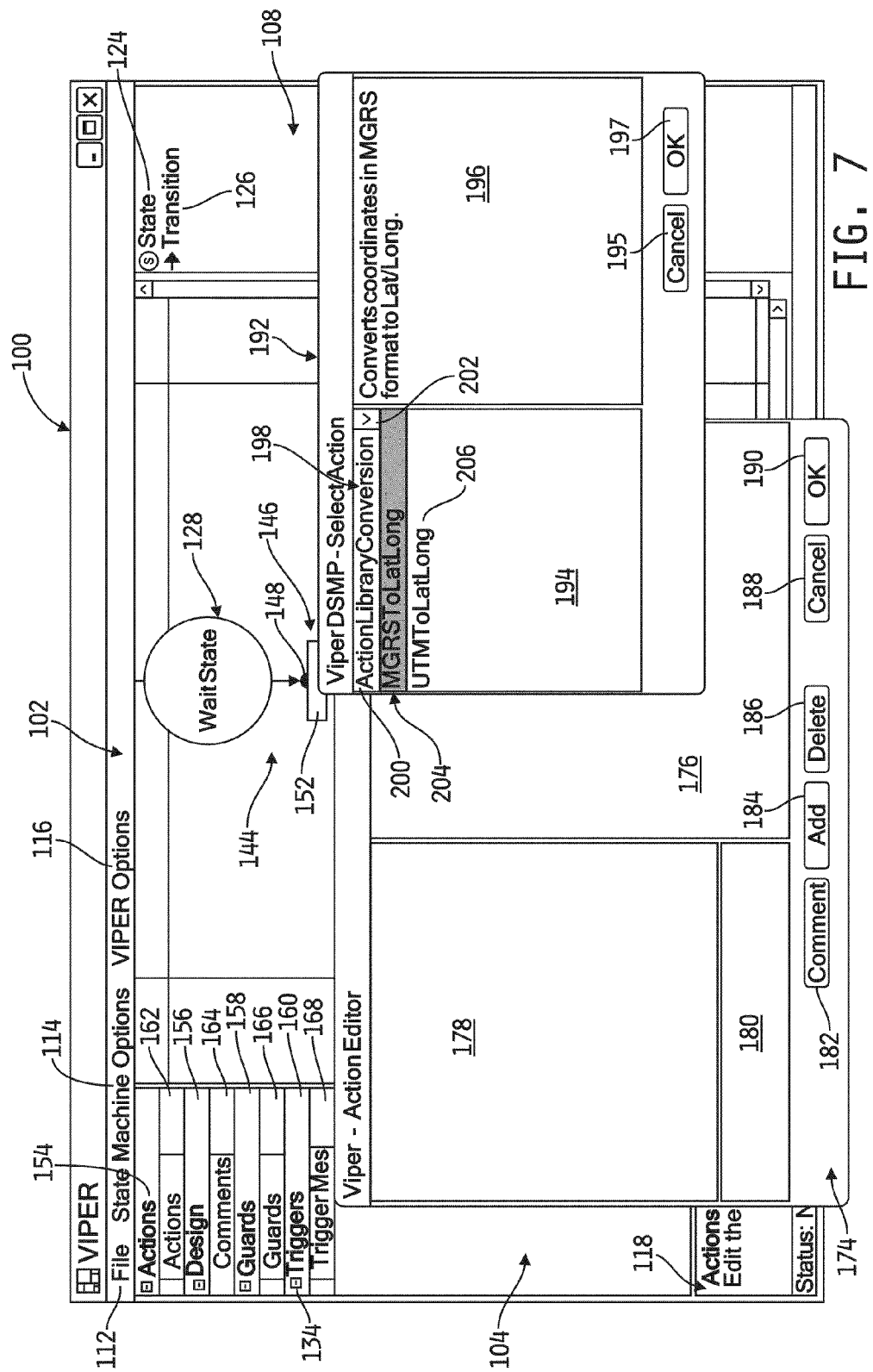

Referring now to FIG. 7, when the technician activates editor button 172, an editor window 174 pops up to provide an environment for defining standard actions to be associated with the FSM element. Editor window 174 generally includes an actions area 176, an arguments pane 178, a comments area 180, a comment button 182, an add button 184, a delete button 186, a cancel button 188, and an OK button 190. As is further described below, actions area 176 provides a listing of standard actions and comments (if any) associated with those actions selected or provided by the technician. Arguments pane 178 generally lists the properties of any arguments associated with a highlighted action listed in actions area 176. Comments area 180 is automatically populated with instructional information relating to the currently active portion of editor window 174.

The technician may assign a standard action to transition element 146 by clicking add button 184 of editor window 174, which causes VIPER to provide action selection window 192. Action selection window 192 includes a listing pane 194, a description window 196, a cancel button 195 and an OK button 197. Listing pane 194 includes a drop-down list box 198 containing a library name field 200 and a drop-down arrow 202. Listing pane 194 also includes an actions listing 204 that includes all of the standard actions 206 included in the currently selected actions library listed in library name field 200. As shown in FIG. 7, the initially listed library is called ActionLibraryConversion in this example, and it includes standard actions 206 called MGRSToLatLong and UTMToLatLong. As the MGRSToLatLong standard action is highlighted, description window 196 includes a brief description of the functionality of the MGRSToLatLong standard action. The standard actions 206 associated with each actions library are grouped into the actions library because they share some characteristic(s). For example, a variety of standard actions used in the process of displaying information to the end-user may be grouped together in an actions library called DisplayActions.

Figure 8:
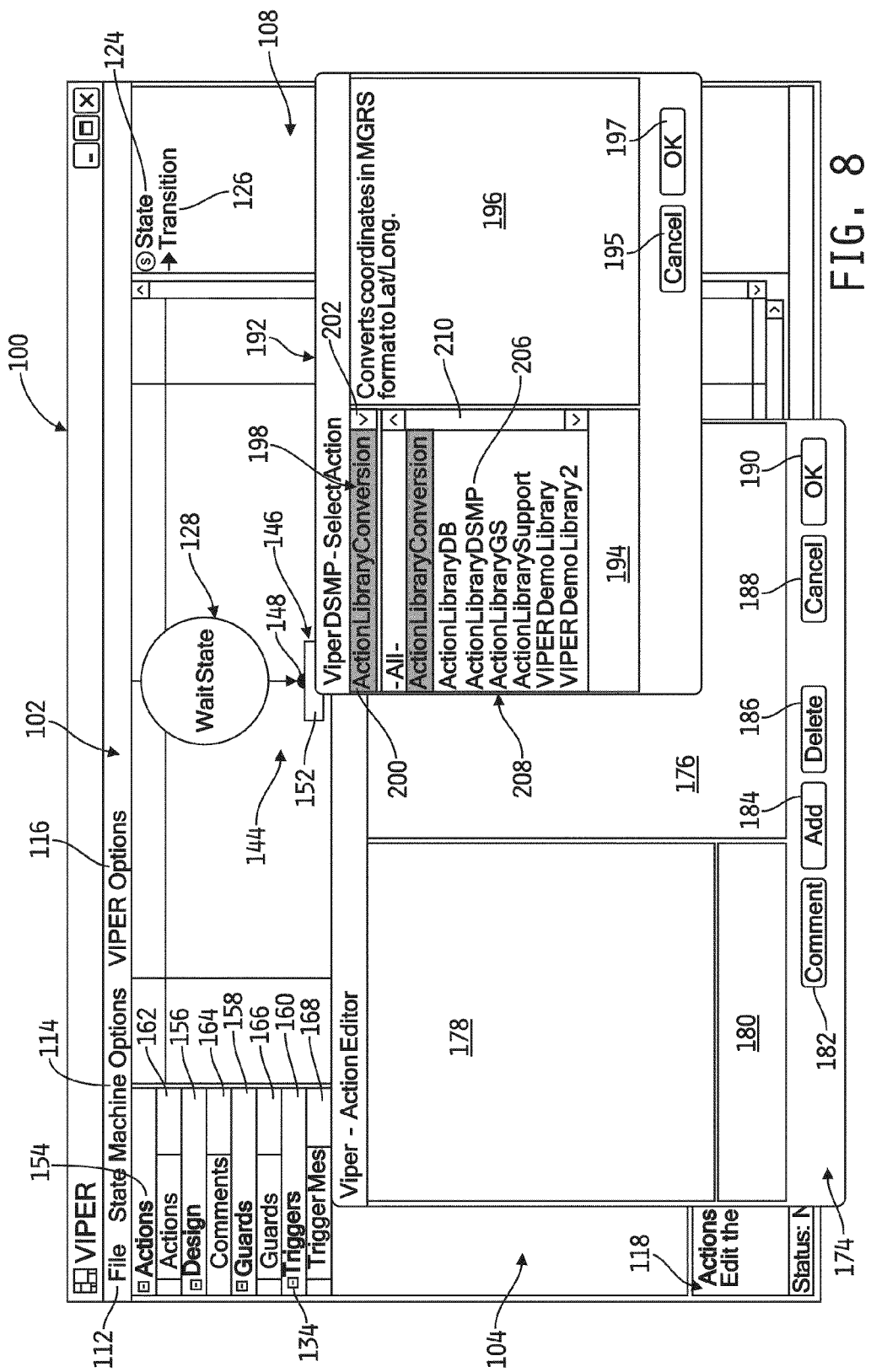

The technician may chose actions from among the currently listed standard actions or click drop-down arrow 202, which causes drop-down list box 198 to display a library list 208 with a scroll bar 210 as shown in FIG. 8. As shown, one of the options in library list 208 is "-All-," activation of which populates actions listing 204 with all of the standard actions 206 contained within all action libraries accessible by VIPER. When the technician selects a desired standard action 206 from actions listing 204 by highlighting the action and activating OK button 197 of action selection window 192, action selection window 192 is no longer displayed and the selected standard action 206 is listed in actions area 176 of editor window 174. In this example, the technician does not select a standard action 206 to associate with transition element 146.

Figure 9:
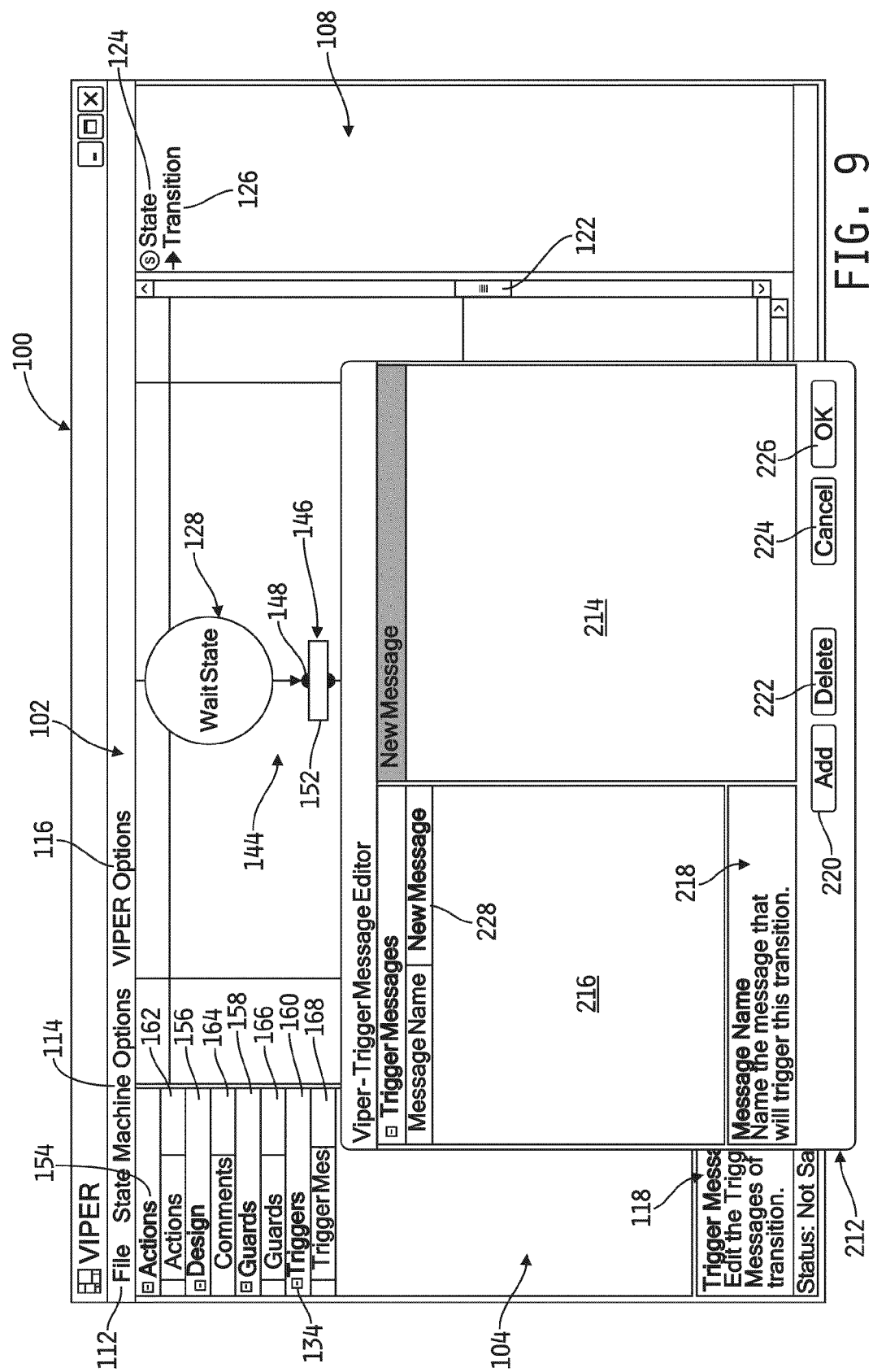

Referring now to FIG. 9, when the technician clicks in trigger messages field 168, another editor button (not shown) identical to editor button 172 of FIG. 6 is displayed in trigger messages field 168 and instructional information relating to the use of trigger messages field 168 is provided in comments area 118. When the technician activates the editor button, a trigger editor window 212 similar to editor window 174 (FIG. 7) pops up to provide an environment for defining the trigger for activating transition element 146. Trigger editor window 212 includes a trigger area 214, a name pane 216, a comments area 218, an add button 220, a delete button 222, a cancel button 224, and an OK button 226.

Figure 10:
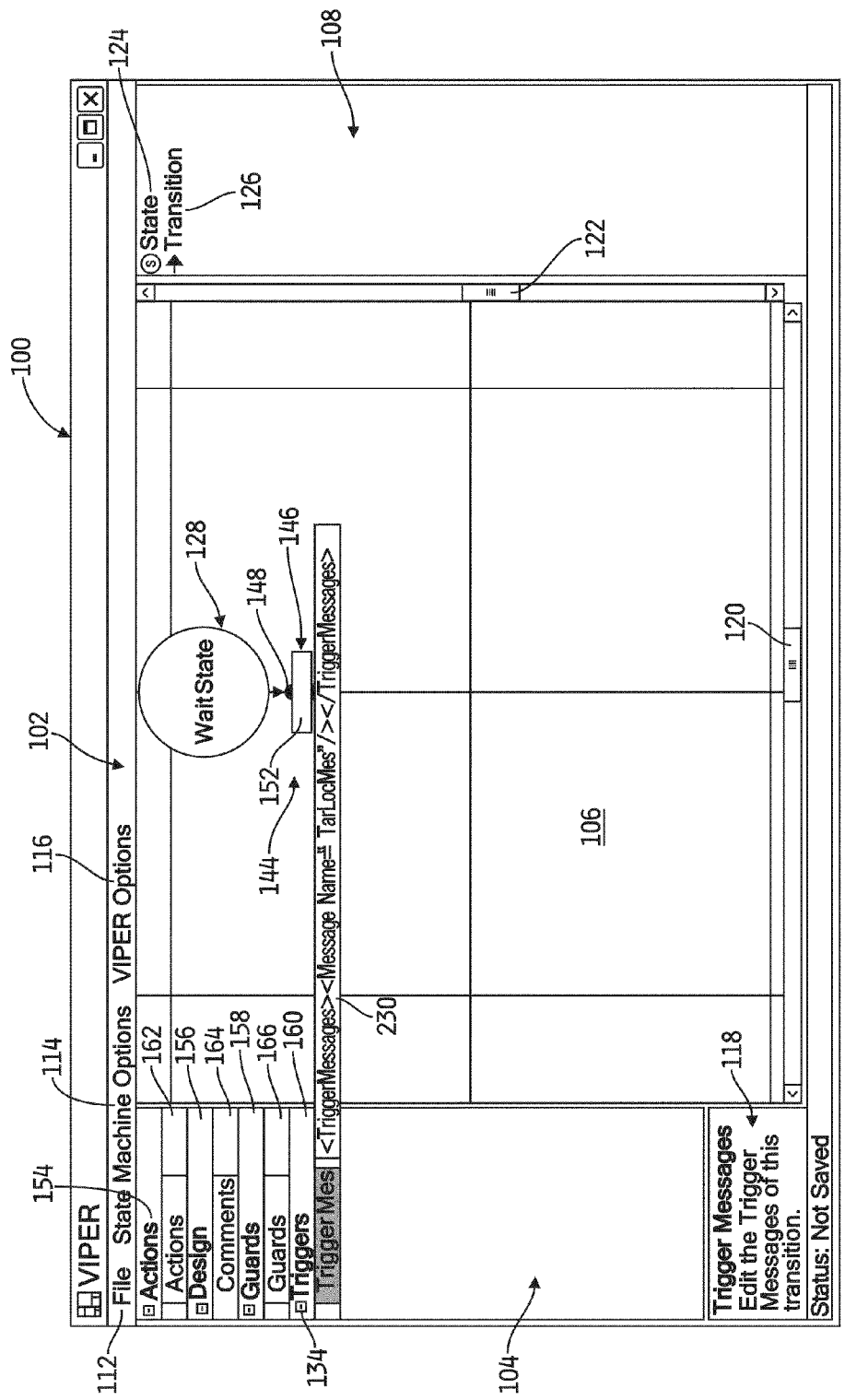

The technician defines triggers with knowledge of the name of the object provided to model 144 from an external source, such as another model or system. In this example, the technician knows model 144 will be receiving messages named "TarLocMes" from a target acquisition source including information about the location of a target. Accordingly, the technician replaces the default "NewMessage" text in the message name field 228 of name pane 216 with the name TarLocMes and clicks OK button 226 to associate the trigger with transition element 146. VIPER responds by removing target editor window 212 and populating trigger messages field 168 with an XML description 230 of the trigger as defined. As shown in FIG. 10, XML description 230 is displayed when the technician hovers a pointer over trigger messages field 168. In another embodiment, the trigger name provided in message name field 228 is also displayed adjacent transition element 146 to remind the technician of the trigger associated with the transition element.

Figure 11:
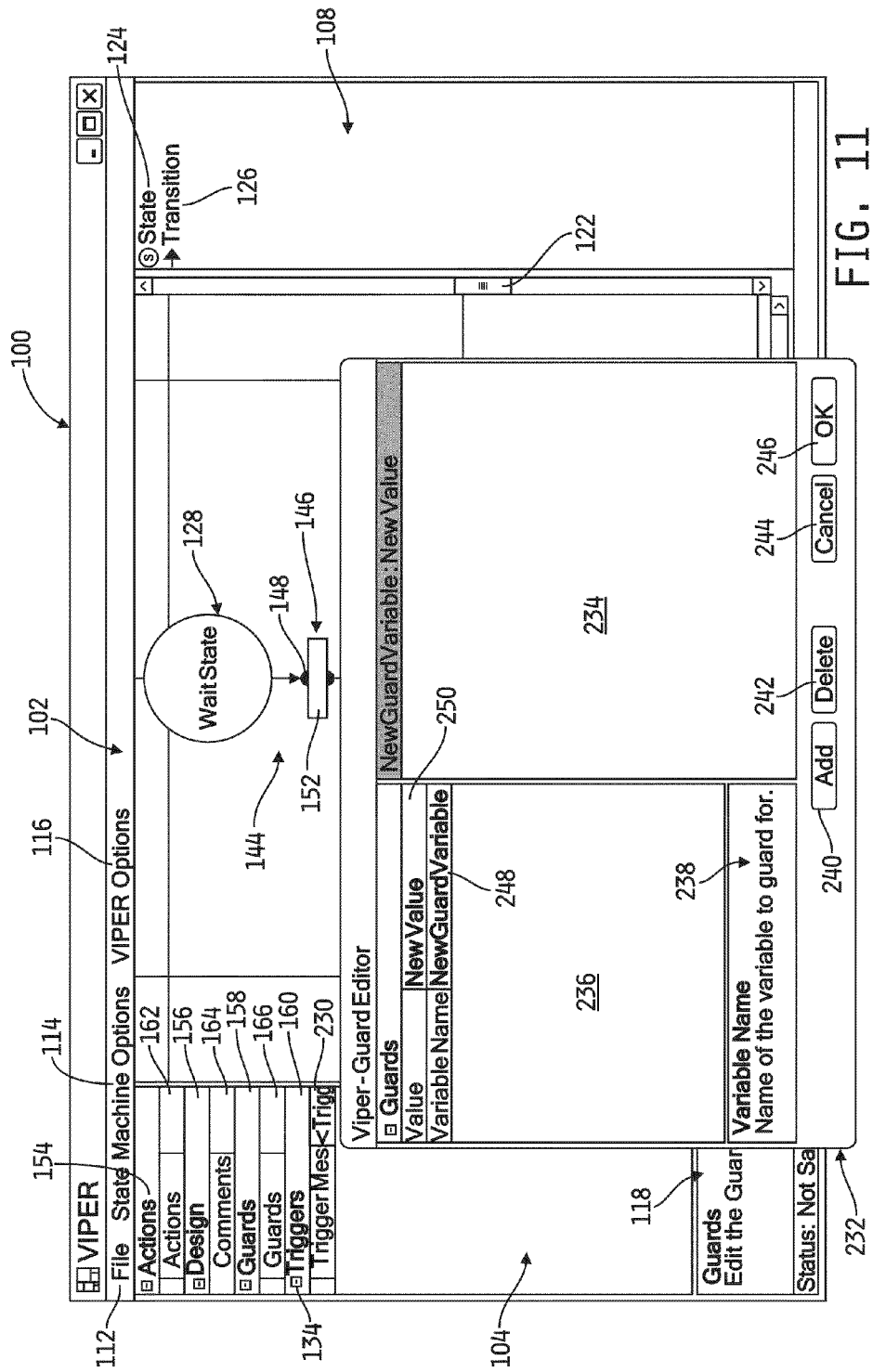
Figure 12:
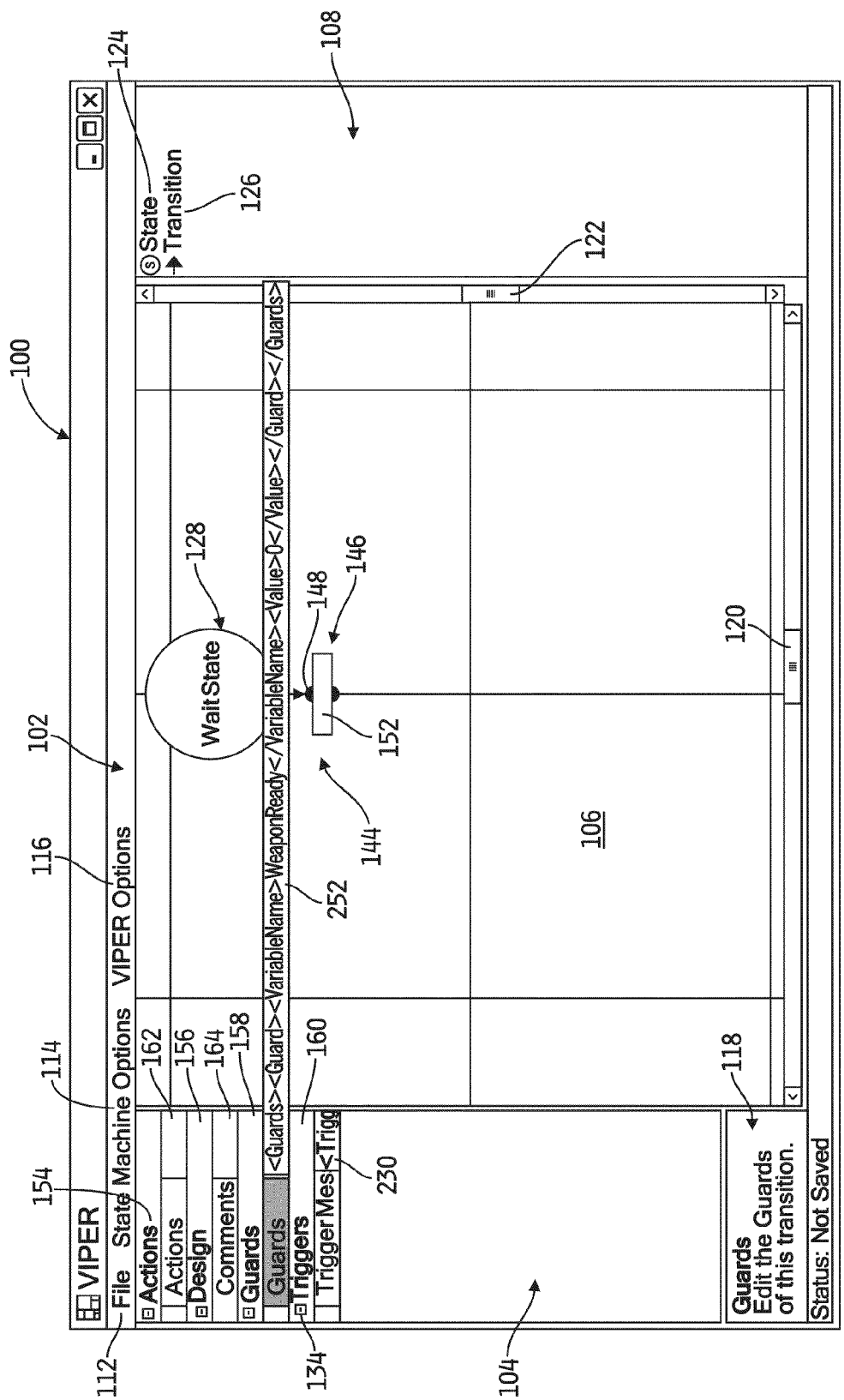

FIG. 11 depicts the guard editor window 232 displayed when the technician clicks in guards field 166 and activates an editor button (not shown) displayed as a result. Like trigger editor window 212 of FIG. 9, guard editor window 232 includes a guard area 234, a name pane 236, a comments area 238, an add button 240, a delete button 242, a cancel button 244, and an OK button 246. Guards are similar to triggers in that they define conditions which must be met for the transition from one state to another to occur. Unlike triggers, which are provided by a source external to model 144, guards are internal conditions which are checked after a trigger is satisfied, and must also be satisfied before the corresponding transition is performed. The technician must have knowledge of the name of the guard and the required value for activation of the transition. In this example, the technician knows model 144 will include a variable called "WeaponReady," which that must have a value of 0 when the TarLocMes trigger occurs in order to properly activate transition element 146. Thus, the technician replaces the default "NewGuardVariable" text in the variable name field 248 of name pane 236 with the name "Weapon Ready" and provides a value of 0 in value field 250. When the technician clicks OK button 246, VIPER removes guard editor window 232, associates the newly defined guard with transition element 146, and populates guards field 166 with an XML description 252 of the guard as defined. As shown in FIG. 12, XML description 252 is displayed when the technician hovers a pointer over guards field 166.

Figure 13:
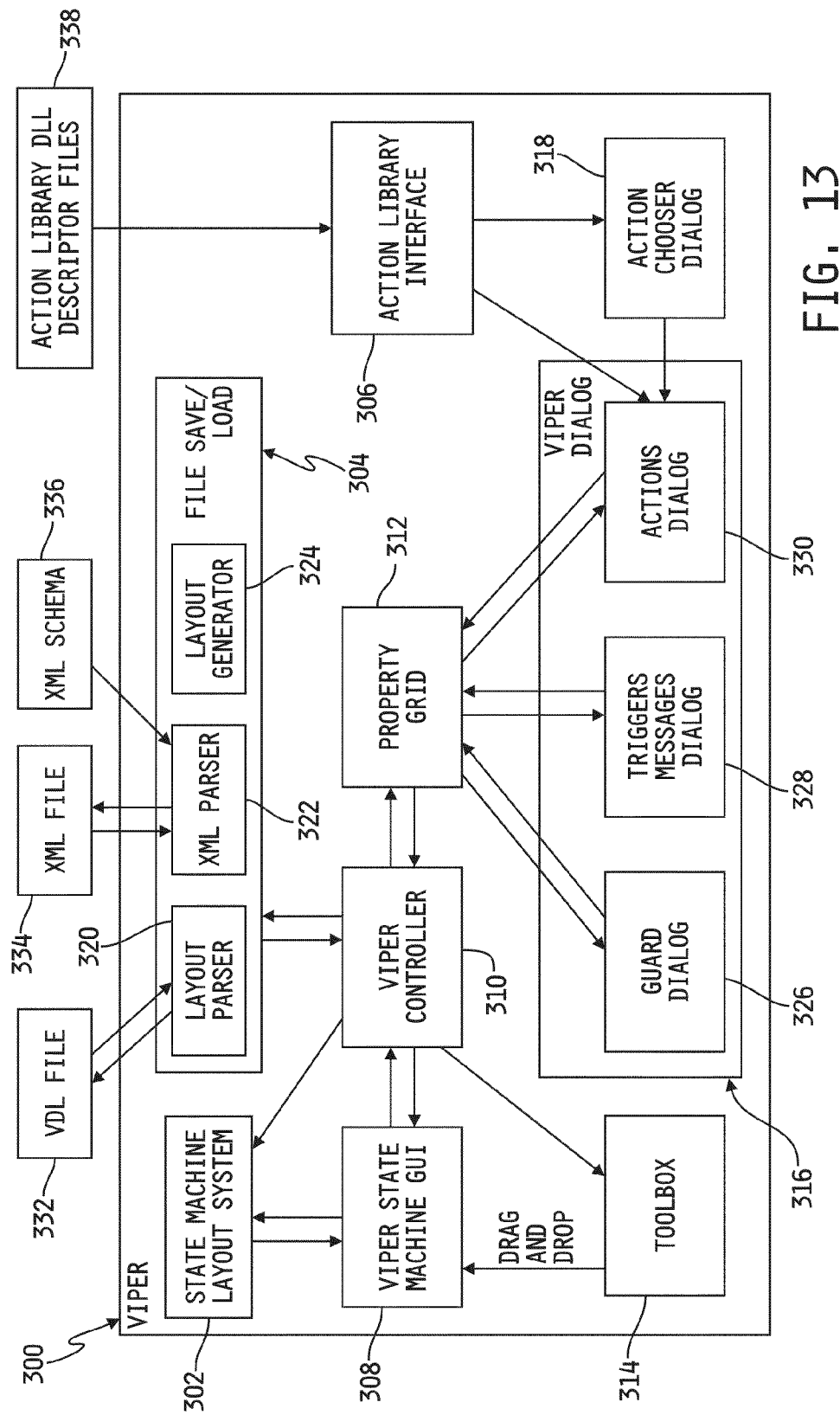
FIG. 13 is a conceptual architectural diagram of VIPER and associated file systems.

FIG. 13 is a functional block diagram of the structure of VIPER, as well as various types of stored information used by VIPER. As shown, VIPER 300 generally includes a state machine layout system 302, a file save/load block 304, an action library interface 306, a state machine GUI 308, a controller 310, a property grid block 312, a toolbox 314, a dialog box 316, and an action chooser dialog box 318. File save/load block 304 includes a layout parser 320, an XML parser 322, and a layout generator 324. Dialog box 316 includes a guard dialog box 326, a triggers messages dialog box 328 and an actions dialog box 330. In addition to VIPER 300, FIG. 13 depicts a VDL file 332, an XML file 334, an XML schema 336 and an action library 338.

Action library 338 includes the DLL descriptor files which include the XML files containing the descriptions of the commands used by the DSMP and the various options associated with the commands. The DLL descriptor files populate library name field 200 of FIG. 7. The commands include standard actions 206 used to populate listing pane 194 of action selection window 192 as shown in FIG. 7 and ultimately executed by the DSMP. When the user actuates dropdown arrow 202 of action selection window 192, each of the DLL descriptor files is displayed in library list 208 (FIG. 8). Action library 338 is located in the same folder as VIPER 300 and upon initialization, VIPER 300 locates action library 338 and loads the DLL descriptor files.

Action library interface 306 is essentially an internal library that loads and parses the DLL descriptor files from action library 338 in response to user interaction with action chooser dialog box 318, which defines the contents of action selection window 192.

Guard dialog box 326, triggers messages dialog box 328 and actions dialog box 330 are three variations of a common base of code, and are thus depicted as part of dialog box 316. Actions dialog box 330 of dialog box 316 generates and defines the content of editor window 174 (see, e.g., FIG. 7). When the user clicks on, for example, state element 128 in workspace 106, and then clicks on editor button 172 to bring up editor window 174, the user is activating property grid 312 which stores text strings containing SQL. Property grid 312 generates and defines the content of properties pane 104 of design screen 100. When property grid 312 calls up editor window 174, it sends the SQL string to editor window 174 which parses the actions and presents them in the format described above. After that, the user may edit the actions displayed in actions area 176 using add button 184, delete button 186 and comment button 182. By doing so, the user is interacting with action library interface 306 to determine what standard actions 206 are available and the options associated with each standard action 206. By clicking OK button 190 of editor window 174, the user causes editor window to convert the actions from the present list back into an SQL string, which is returned to property grid 312. Property grid 312 then stores the SQL string in association with the appropriate state or transition element. The functionality of guard dialog box 326 and triggers dialog box 328 is similar to that of actions dialog box 330 described above.

The function of controller 310 is primarily to manage data. Controller 310 does not interact directly with the user, but instead keeps track of the settings for each element and the interactions between elements. That information is relayed by controller 310 to property grid 312 and state machine GUI 308 for display to the user.

Toolbox 314 defines the content of elements pane 108, which in one embodiment of the present disclosure consists of state icon 124 and transition icon 126. As described above, these icons are used by the user through dragging and dropping onto workspace 106 to build an FSM model 144.

State machine GUI 308 handles all of the aspects of drawing FSM model 144 by communicating with controller 310 to determine the current state of FSM model 144. Controller 310 provides data regarding the current state of FSM model 144 and state machine GUI 308, in conjunction with state machine layout system 302 generates the image and displays it on workspace 106. State machine GUI 308 also handles the interactions with an interface device (such as a mouse, keyboard, etc.). State machine layout system 302 keeps track of whether aspects of FSM model 144 change, and only executes a redrawing operation of FSM model 144 when the model has changed. Thus, if the user is only scrolling using scroll bar 122, for example, state machine layout system 302 repositions FSM model 144 without re-generating FSM model 144 to improve speed of the interface.

XML file block 334 includes FSM model 144 in a format that can be read by the DSMP. XML parser 322 of file save/load block 304 converts the files of XML file 334 into a format that is recognizable by controller 310. XML parser 322 uses XML schema block 336 to determine the definitions of valid XML files, which XML parser 322 uses to verify that XML files from XML file block 334 are valid. If the XML file does not match the corresponding schema from XML schema block 336, XML parser will not load the file. XML files from XML file block 334 only contain the information that the DSMP actually needs, but VIPER 300 needs further information because of its function of providing a graphic representation of FSM model 144. Layout parser 320 of file save/load block 304 connects to VDL file block 332 which includes this additional information such as the shape definitions of state elements and their positions on workspace 106. Thus, each time an element or other object is actually moved in the program, controller 310 is updated, but when FSM model 144 is saved, VDL file block 332 is updated. Layout generator 324 of file save/load block 304 includes code for approximating a layout of FSM model 144 when an XML file in XML file block 334 does not have a corresponding VDL file in VDL file block 332, which should occur rarely but would otherwise result in an error.

The following is a description of loading an FSM model 144 using VIPER 300 and modifying an aspect of the FSM model 144. Using file dropdown 112 of menu bar 102 (FIG. 1), the user selects file open as facilitated by state machine GUI 308. When the user provides the file name, controller 310 relays that information to file save/load block 304, which activates layout parser 320 and XML parser 322 to locate the file in the specified storage location, loads the corresponding XML files and VDL files into memory using XML schema block 336 to verify the data is valid in the manner described above. After the files are confirmed as valid, layout parser 320 and XML parser 322 begin relaying commands to controller 310 to build the model. Controller 310 returns control back to state machine GUI 308 which generates the graphic representation of FSM model on workspace 106. Each time an element is loaded, controller 310 updates state machine layout system 302 that an aspect of FSM model 144 has changed. By default, controller 310 selects the first element loaded, and populates properties pane 104 with data corresponding to that element.

After FSM model 144 is drawn on workspace 106 and the attributes of the first element are displayed, the user may, for example change an exit action associated with a state element 128. To do so, the user clicks on editor button 172 in actions field 162 (FIG. 6), which causes state machine GUI 308 to generate editor window 174 as shown in FIG. 7. Actions chooser dialog box 318 then parses the attributes of the selected element, which are displayed in arguments pane 178 of editor window 174. The user may change attributes of the selected action, delete the action using delete button 186, or add a new action using add button 184 in the manner described above. If the action is changed, controller 310 updates XML file block 334 with new XML code for use by the DSMP through XML parser 322.

The DSMP includes the high-level programming which actually executes the XML code generated by the technician using VIPER 300. The DSMP obtains the XML code from XML file 334 and implements the functionality specified by the XML code to generate the application corresponding to FSM model 144. As indicated above and shown in FIG. 14, the two primary inputs to DSMP 400 are the XML code from XML file 334 and standard actions 206 stored in action library 338. Standard actions 206 are predefined execution functions that are not suitable for description in XML (e.g., a simple addition function), which are called for in the XML descriptions and accessed and executed by DSMP 400. For example, the XML descriptions may provide two numbers to DSMP 400 along with a call for an addition standard action 206. DSMP 400 then inputs the two numbers into the standard action 206 and uses the result. Standard actions 206 are written in high-level programming language and are provided in action library 338 by the software developer for use by the technician operating VIPER 300. In this manner, the present system provides enhanced flexibility for application development and modification by a technician close to the location of deployment. As all but certain fundamental programming functions (i.e., standard actions 206) are implemented using XML which is developed and/or modified using FSM models 144 and VIPER 300, the technician can create entirely new FSM models 144 for new applications and/or make substantial modifications to existing applications, all without involvement of programmers or the need for familiarity with high-level programming.

Figure 14:
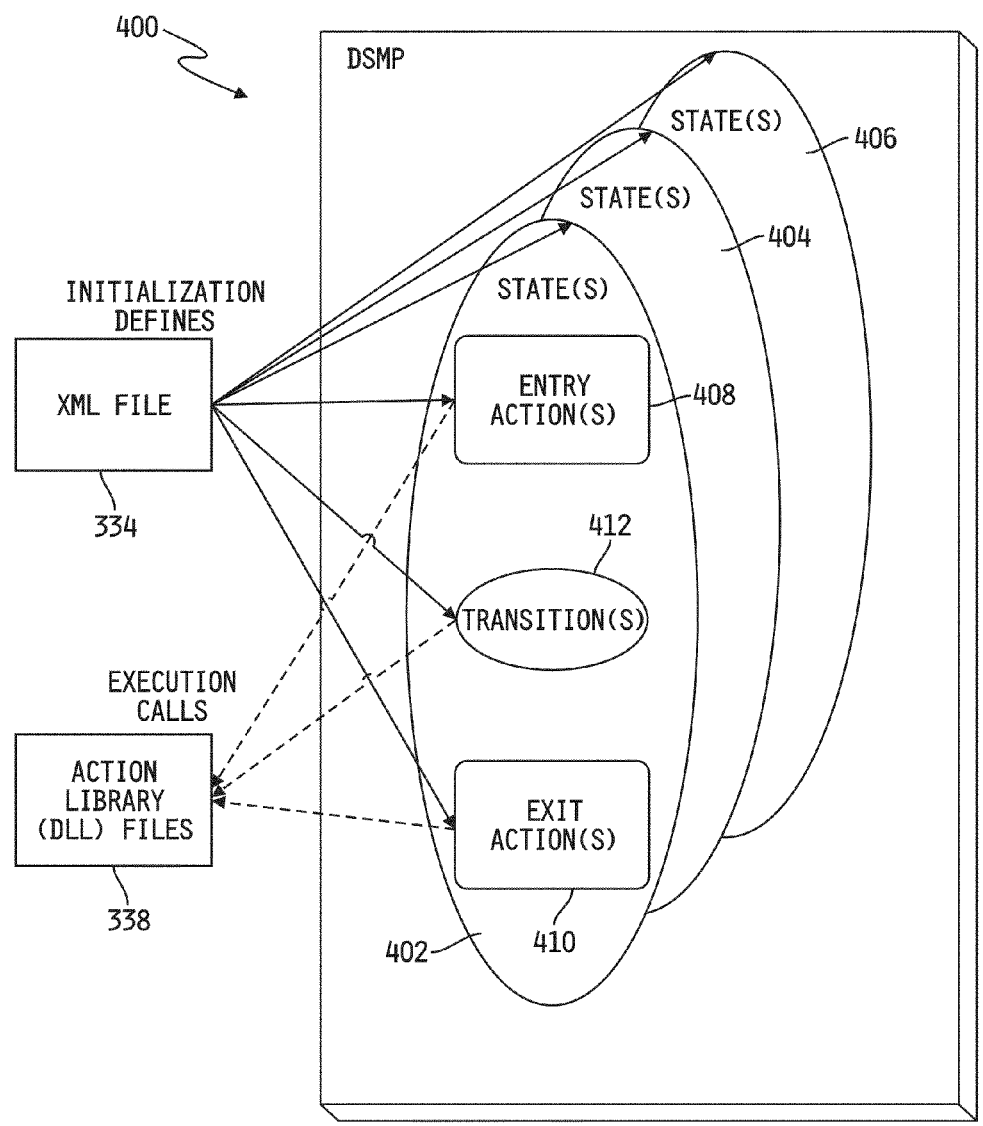
FIG. 14 is a conceptual diagram of the DSMP and associated file systems.

DSMP 400 processing is event or data driven, rather than time driven. As indicated above, XML descriptions from XML file 334 define states, and characteristics of the states. DSMP 400 receives those state definitions and processes from state to state based on internal or external triggers. This is depicted in FIG. 14 by sequential states 402, 404, and 406. As is also indicated above, each state may include an entry action 408 (e.g., entry action 34A of FIG. 2), an exit action 410 (e.g., exit action 34B of FIG. 2) and may be related to other states by one or more transitions 412 (e.g., transition 50 of FIG. 2). In general, the output of DSMP 400 includes user interface messages for execution by GUIX which result in the presentation of the application to the end user, and system or internal outputs which interact with the various systems (e.g., a fire control system) being controlled by the application.

Because DSMP 400 is essentially a generic XML processor, it does not include hard-coded subroutines or other traditional linear programming. DSMP 400 instead simply receives instructions from XML descriptions in XML file 334 during run-time, and performs each task specified by the XML until the last task is complete. DSMP 400 may fairly be characterized in this regard as a program with all of the parameters left blank—to be supplied by the XML descriptions. In this sense, DSMP 400 functions as an XML command interpreter. The XML may cause DSMP 400 to automatically transition from one state to another, or may cause DSMP 400 to wait for an input (i.e., trigger) in the form of, for example, an external input from a system controlled by the application or another process executing on DSMP 400. Upon receiving such a trigger, DSMP 400 may transition to a new state, in some instances executing further XML instructions defined as part of an exit action 410 of the present state.

Figure 15:
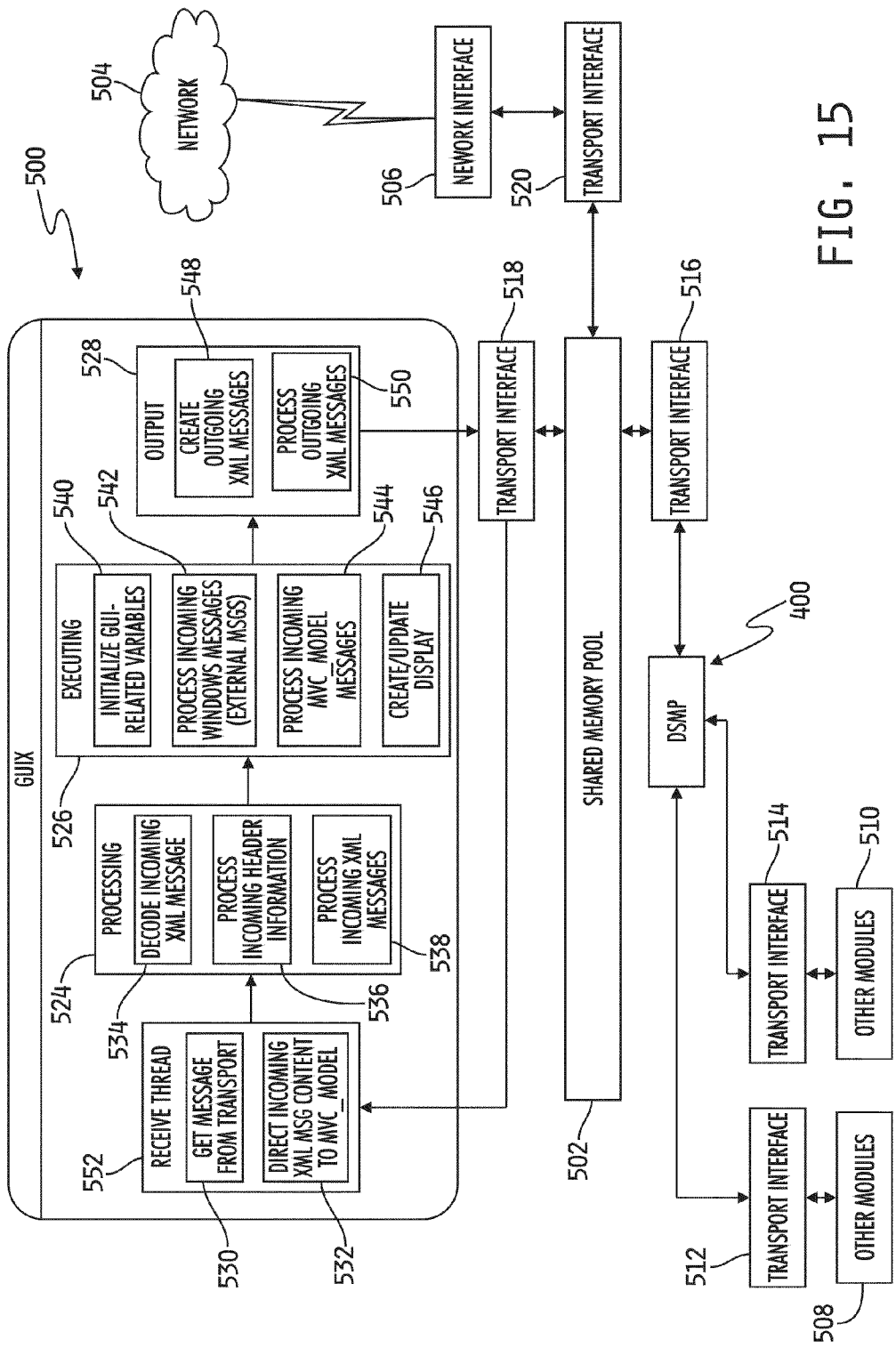
FIG. 15 is a conceptual diagram of the GUIX and associated file systems.

This concept of the present system is further implemented through use of an extensible (or "dumb") GUI, herein called "GUIX" 500 (see FIG. 15). GUIX 500 is not pre-programmed with standard screens, pop-ups, menus, toolbars, or other common aspects (or "widgets") of a user interface. Instead, GUIX 500 is generated at run-time by DSMP 400 using the XML code stored in XML file block 334. In one embodiment of the present system, DSMP 400 retrieves XML from XML file block 334 and instructs GUIX 500 regarding what to display and/or the characteristics of a particular item. GUIX 500 then carries out the instruction. In another embodiment, DSMP 400 posts instructions in a storage location (e.g., a bulletin board such as shared memory pool 502 of FIG. 15), which GUIX 500 accesses, processes and executes. In this manner, the storage location essentially functions as a memory for GUIX 500.

Referring now to FIG. 15, GUIX 500 is, in one embodiment of the present disclosure, implemented in a Windows environment. In addition to GUIX 500, FIG. 15 depicts a shared memory pool 502, DSMP 400, a network 504, a network interface 506, other modules 508, 510, and a plurality of transport interfaces 512-520. GUIX 500 generally includes functionality that is represented conceptually by receive thread block 522, processing block 524, executing block 526, and output block 528. Receive thread block 522 includes blocks 530, 532, processing block 524 includes blocks 534, 536, 538, executing block 526 includes blocks 540-546, and output block 528 includes blocks 548, 550.

Receive thread 522 monitors the presence of new messages to GUIX 500. The messages are provided to receive thread 522 by transport interface 518 which has access to shared memory pool 502. Shared memory pool 502 (which functions in substantially the same manner as a bulletin board) temporarily stores messages exchanged between GUIX 500 and DSMP 400. DSMP 400 sends and receives messages to and from shared memory pool 502 through transport interface 516. The messages received by receive thread 522 contain XML content that instructs GUIX 500 to perform a function. Box 530 of receive thread 522 represents the functionality of obtaining messages from transport interface 518 and box 532 represents the functionality of directing the XML content of incoming messages to processing block 524.

Box 536 of processing box 524 processes header information contained in incoming messages to determine the entity that originated the message and/or the destination for a result of instructions contained in the message. For example, box 536 may determine from header information that when GUIX 500 displays a particular button and the button is actuated by a user, the result should be a message to a particular destination with information indicating that the button was actuated. Box 538 actually processes the XML instructions contained in incoming messages, and box 534 determines the characteristics of any widgets or forms to be displayed according to the XML instructions (e.g., type, size, location, color. etc.).

Box 542 of executing box 526 processes messages provided to GUIX 500 from the operating system. These messages are generated when, for example, the user actuates a displayed button, changes a tab page, selects a drop-down list, etc. Box 540 represents the functionality of initializing variables used by GUIX 500 (e.g., counters, widget values, button counts, default forms, etc.). Box 546 represents the functionality of executing block 526 for creating new widgets based on the XML instructions from received messages. Thus, box 546 actually includes code for setting the widget size, position, color, font, and other attributes.

Boxes 548 and 550 of output block 528 receive the results of user interaction with various widgets displayed by GUIX 500 as part of the run-time application, and process those results into the form of a message that is stored in shared memory pool 502 by transport interface 518.

Network 504 represents either a private network or an external network (such as the Internet) to which other systems that interact with the application are connected. As should be understood from the foregoing, these other systems may post message to shared memory pool 502 through network interface 506 and transport interface 520 that result in an action by GUIX 500. In the same manner, messages from GUIX 500 may be passed to these other systems (e.g., weapons control systems, etc.) through network 504.

Other modules 508, 510 represent external systems such as a fire control system (as mentioned above) or an inventory system. In the embodiment shown, the other modules 508, 510 communicate with shared memory pool 502 via transport interfaces and DSMP 400.

The foregoing description of the invention is illustrative only, and is not intended to limit the scope of the invention to the precise terms set forth. Although the invention has been described in detail with reference to certain illustrative embodiments, variations and modifications exist within the scope and spirit of the invention as described and defined in the following claims.

What is claimed is:

1. A computer implemented system for developing an application program having functionality that corresponds to a finite state machine (FSM) model, including:

a first plurality of non-transitory machine readable instructions adapted to be stored on a first computer comprising an action library including a plurality of dynamic link library (DLL) files operable to execute a plurality of functions comprising one or more standard actions associated with a plurality of potential FSM models;

a second plurality of non-transitory machine readable instructions adapted to be stored in a second computer system operable to generate a visual interface that generates a graphical environment on a display associated with said second computer system, the graphic environment including a workspace for creating and displaying an FSM model representing functionality of an application program, the FSM model including a plurality of elements including state elements, said standard actions, and transition elements connecting the state elements, wherein said visual interface further is adapted to output a first data file that is adapted to be output from said second computer and stored in said first computer comprising a third plurality of non-transitory machine readable instructions comprising one or more specifications of a generated said FSM model which includes markup language descriptions comprising one or more identifiers for said plurality of functions associated with said one or more standard actions within said DLL files;

a fourth plurality of non-transitory machine readable instructions adapted to be stored in said first computer system comprising a dynamic state machine processor (DSMP) that uses the first data file storing said FSM model elements and said action library to generate the application program executed at run-time, each of the FSM elements is referenced in said first data file including at least one of said markup language descriptions defining functionality of a respective one of said FSM elements, at least some of the markup language descriptions including function calls to said standard actions comprising one or more said identifiers to one or more said standard actions stored in said DLLs within said action library corresponding to basic software functions associated with a control system; and a fifth plurality of non-transitory machine readable instructions comprising an extensible graphic user interface (GUIX) adapted to be stored in said first computer system that provides an interactive control system interface including the end-user interface features to the end-user as generated during run-time by the DSMP based on the action library and the first data file comprising said FSM model elements, wherein said GUIX is operable to generate a plurality of interactive graphical user interface displays based on said first data file, said DSMP, and said action library, where the DSMP performs a lookup of said standard actions stored in said DLL files that are specified in said first data file and generates said plurality of interactive graphical user interfaces based at least in part on data stored in said first data file and retrieved from said action library;

wherein the visual interface includes a plurality of editor buttons, activation of which cause the visual interface to display editor windows that permit a technician to build said FSMs within said visual interface by defining or selecting said FSM elements including said state elements, said standard actions associated with said DLL files stored in said action library, and said transition elements as well as define or modify functionality of the FSM elements, the markup language descriptions of the functionality being stored in a database in said second computer comprising at least one said first data file;

wherein the visual interface includes a controller, a state machine GUI and a state machine layout system, the state machine GUI and the state machine layout system being configured to generate a graphic representation of the FSM model on the workspace according to a current state of the FSM model provided by the controller.

2. The system of claim 1 wherein the standard actions are written in a high-level programming language and stored in a library associated with the visual interface and the DSMP.

3. The system of claim 1 wherein the DSMP generates instructions for the GUIX and posts the messages in a storage location that is accessible by the GUIX during run-time.

4. The system of claim 1 wherein visual interface includes a plurality of icons corresponding to the elements of the FSM model and is configured to permit the technician to drag and drop the icons onto the workspace to configure the FSM model.

5. The system of claim 1 wherein the visual interface responds to a command from the technician to save the FSM model by saving the markup language descriptions to a database.

6. The system of claim 1 wherein at least some of the state elements include an associated entry action and an associated exit action, the editor windows including an actions editor window that enables the technician to configure characteristics of the actions.

7. The system of claim 6 wherein the actions editor window includes an add button, activation of which causes the visual interface to display an action selection window including a listing pane and a description window.

8. The system of claim 7 wherein the action selection window includes a list box including a name of a library of said standard actions stored in said action library associated with the visual interface and the DSMP.

9. The system of claim 8, wherein the visual interface includes an actions library interface that loads and parses the standard actions stored in the standard action library.

10. The system of claim 1 wherein at least some of the transition elements include at least one transition element comprising an associated trigger, the presence of which during run-time causes operation of the application program to transition from one state connected to the corresponding transition element to another state connected to the corresponding transition element.

11. The system of claim 10 wherein the editor windows include a trigger editor window that enables the technician to configure characteristics of the triggers.

12. The system of claim 1 wherein at least some of the transition elements include an associated guard, the presence of which during run-time causes operation of the application program to transition from one state connected to the corresponding transition element to another state connected to the corresponding transition element.

13. The system of claim 12 wherein the editor windows include a guard editor window that enables the technician to configure characteristics of the guards.

14. The system of claim 1 wherein the visual interface includes a file save/load block that interfaces with the database of markup language descriptions and an markup language schema block to save and load markup language descriptions associated with FSM elements according to schema included in the markup language schema block.

15. A method for developing an application program having functionality that corresponds to a finite state machine (FSM) model, including the steps of:

providing a library of dynamic link library (DLL) which include machine interpreted instructions describing standard actions, said library of DLLs stored in a first computer;

providing a visual interface adapted to be stored in a second computer that generates a graphical environment on a display, the graphical environment including a workspace for creating and displaying an FSM model representing functionality of an application program adapted to be generated and executed in said first computer, the FSM model including a plurality of elements including state elements and transition elements connecting the state elements, wherein said FSM model is stored in an interpreted language comprising said markup language function calls corresponding to function calls to selected said machine interpreted instructions describing said standard actions, said FSM model is output as a first data file that is exported from said second computer and used in said first computer;

providing a software processor in said first computer that uses the FSM model elements to generate the application program executed at run-time, each of the FSM elements including an markup language description defining functionality of a respective one of said FSM elements, at least some of the markup language descriptions including said function calls to said standard actions corresponding to basic software functions; and providing a graphic user interface in said first computer that provides the end-user interface features to the end-user as generated during run-time by the software processor based on the FSM model elements;

wherein the visual interface includes a plurality of editor buttons, activation of which cause the visual interface to display editor windows that permit a technician to define or modify functionality of the FSM elements, the markup language descriptions of the functionality being stored in a database; wherein the visual interface includes a controller, a state machine GUI and a state machine layout system, the state machine GUI and the state machine layout system being configured to generate a graphic representation of the FSM model on the workspace according to a current state of the FSM model provided by the controller.

16. The method of claim 15 further including the step of posting messages from the software processor to a shared memory pool, the messages including instructions for the graphic user interface to process.

17. The method of claim 16 further including the step of using the graphic user interface to retrieve the messages from the shared memory pool and execute the instructions in the messages to generate interface objects for display to the end-user.

18. A computer implemented method for developing and executing an application program, including the steps of:

providing an action library in a first computer comprising a dynamic link library (DLL) comprising functions describing one or more standard actions, wherein each of said functions are referenced by a unique function call which has an identifier;

creating a finite state machine (FSM) model of the application program using a visual interface in a second computer, the FSM model including a plurality of elements comprising states, triggers and actions, wherein said visual interface is adapted to enable a user to select or define said states and triggers, said visual interface is further adapted to enable a user to select one or more said actions by said identifier associated with each selected said standard action;

storing a plurality of markup language descriptions of each of the FSM model elements in a file structure on a first computer system including selected markup language descriptions associated with selected said identifiers or function calls associated with each of said FSM model elements created using said visual interface;

executing said FSM on said first computer system using the markup language descriptions at run-time using a software processor to generate messages representing the markup language descriptions based on said selected identifier or function calls which are looked up in said action library storing said DLLs based on said plurality of markup language descriptions;

using a graphic user interface in said first computer system to execute the messages at run-time to provide end-user interface features representing the application program to an end-user; wherein the visual interface includes a controller, a state machine GUI and a state machine layout system, the state machine GUI and the state machine layout system being configured to generate a graphic representation of the FSM model on the workspace according to a current state of the FSM model provided by the controller.

19. The method of claim 18 wherein the creating step includes the step of providing a graphical environment on a display, the graphical environment including a workspace for displaying the FSM model.

* * * * *